(12) United States Patent
Chakravorty

(10) Patent No.: US 7,023,851 B2
(45) Date of Patent: Apr. 4, 2006

(54) ADVANCED SWITCHING MECHANISM FOR PROVIDING HIGH-SPEED COMMUNICATIONS WITH HIGH QUALITY OF SERVICE

(75) Inventor: Sham Chakravorty, McLean, VA (US)

(73) Assignee: Signafor, Inc., McLean, VA (US)

( * ) Notice: Subject to any disclaimer, the term of this patent is extended or adjusted under 35 U.S.C. 154(b) by 592 days.

(21) Appl. No.: 09/973,884

(22) Filed: Oct. 11, 2001

(65) Prior Publication Data

US 2002/0044553 A1   Apr. 18, 2002

Related U.S. Application Data (60) Provisional application No. 60/239,256, filed on Oct. 12, 2000, provisional application No. 60/251,519, filed on Dec. 7, 2000.

(51) Int. Cl.
H04L 12/28 (2006.01)
H04L 12/56 (2006.01)

(52) U.S. Cl. .......... 370/392; 370/395.21; 370/351; 370/356.5; 370/395.52; 370/395.3; 713/160; 713/161; 713/162; 713/168

(58) Field of Classification Search ........ 370/351–356, 370/389, 392, 395.52, 395.3, 395.31; 713/160, 713/161, 162, 168
See application file for complete search history.

(56) References Cited

U.S. PATENT DOCUMENTS

| | | | | |
|---|---|---|---|---|
| 5,822,319 A | * | 10/1998 | Nagami et al. | 370/392 |
| 6,330,239 B1 | * | 12/2001 | Suzuki | 370/395.1 |
| 6,381,244 B1 | * | 4/2002 | Nishimura et al. | 370/395.21 |

FOREIGN PATENT DOCUMENTS

WO   WO 0193540   6/2001

OTHER PUBLICATIONS

"A role for ATM in telephony and IP networks" Computer Networks, Elsevier Science Publishers B.V., Amsterdam, NL, vol. 34, No. 3, Sep. 2000.

* cited by examiner

*Primary Examiner*—Wellington Chin
*Assistant Examiner*—Raj Jain
(74) *Attorney, Agent, or Firm*—McDermott Will & Emery LLP

(57) ABSTRACT

The method described here provides for high-speed, Quality of Service (QoS) driven, and secure transport of voice, video and data packets for facilitating the convergence of multiple networking facilities into one. The method involves replacing one or more bits in the IP header address fields and replacing them with or adding to them unique virtual connection or virtual circuit (VC) identifiers for node-to-node, that is device-to-device, connectivity as well as for representing values or parameters for packet type, QoS, security, network management and node/link resources. Identifiers for the above parameters are developed and saved at each node as a switching table. The values representing the identifiers from a switching table are used to assign virtual connections as well as control the flows of packets.

19 Claims, 8 Drawing Sheets

Representative Description of the IPv4 Header for VIPS

Figure 1. Representative Description of the IPv4 Header for VIPS

Figure 2. Representative Configuration of a VIPS Packet

Figure 3. Representative First or Lead Packet IP Option

Figure 4. Representative Hello Packet Payload

Figure 5. Representative CACK Packet Payload

Figure 6. Representative Functional Details

Figure 7. Representative Packet Queuing Concepts

Figure 8. Representative Distribution of Classes

ADVANCED SWITCHING MECHANISM FOR PROVIDING HIGH-SPEED COMMUNICATIONS WITH HIGH QUALITY OF SERVICE

The present application claims priority of U.S. provisional patent application No. 60/239,256 filed Oct. 12, 2000 and entitled "ADVANCED SWITCHING MECHANISM FOR SPEED AND QUALITY OF SERVICE PROVISIONING", and priority of U.S. provisional patent application No. 60/251,519 filed Dec. 7, 2000 and entitled "ADVANCED SWITCHING MECHANISM FOR SPEED AND QUALITY OF SERVICE PROVISIONING", both patent applications being incorporated herewith by reference.

FIELD OF THE INVENTION

The present application relates to data communications, and in particular, to a packet switching mechanism for providing high-speed transmission of voice, video and data packets with high Quality of Service (QoS).

BACKGROUND OF THE INVENTION

It is a well-known fact that with the advent of fiber-based Packet Over SONET (POS) services, Asynchronous Transfer Mode (ATM) is losing its importance in the WAN environment. ATM is already considered an outmoded technology in the Local Area Network (LAN) environment. Several networking vendors use POS in lieu of ATM in the Wide Area Networks (WANs). Engineers today believe that large networks must not waste 20 to 33% of the bandwidth for a limited set of capabilities such as Constant Bit Rate (CBR) from ATM. Additionally, some engineers consider ATM Segmentation and Re-assembly (SAR) process to be non-scalable at or above 2.4 Gbps. In case of nonstandard ATM devices, even virtual circuit merging process causes scalability problems. The missing requirement in all these deployments is the guaranteed QoS. Missing also are features such as enhanced security, localized failure recovery, congestion avoidance and robust network management. The latter can for instance include billing support facility. ATM has failed to provide these features. If ATM is not the vehicle, then POS being an Internet Protocol (IP) service becomes the next choice. But POS can at best provide a coarse Class of Service (COS) by using IP header's Type of Service (TOS) bits and applying the common routing protocols. With no direct content awareness imbedded in the network, there is thus little or no end-to-end QoS one can expect from POS.

This then brings us to Multiprotocol Label Switching (MPLS). But as people are finding out, MPLS is no panacea either. The most it provides today for QoS is COS from the IP TOS bits. MPLS has no built-in framework for network-imbedded QoS services such as Constant Bit Rate (CBR), Variable Bit Rate (VBR), Real-Time VBR ($VBR_{rt}$), or others. MPLS also does not allocate any means of deploying failure-proof, TCP-based management features in the network. It does not provide any built-in means for local failure recovery or congestion avoidance. All these requirements bring back ATM as the Layer 2 mechanism for MPLS. But like ATM, MPLS wastes a lot of network resources and adds to operational costs for its label distribution processes as well as in processing variable sized packets due to variable number of labels that are attached to the IP packets from node to node.

Finally, MPLS does not add any strength to security or network management needs. These needs are growing astronomically with the growth of the Internet.

SUMMARY OF THE INVENTION

The method of the present invention is called Virtual IP Switching (VIPS). The method establishes hop-by-hop virtual connections and associated signaling methodologies. It sets up switching tables that enables switching of packets in a fast, secure and prioritized manner. Switching or routing signaling used at the time of boot up and on periodic or ad-hoc basis helps identify the path characteristics that are entered in the switching tables. The packet switching or queuing algorithms allocate pools of one or more virtual channels within one or more virtual paths. The algorithms also allocate node resources and bandwidth, and establish security parameters, node and link processing characteristics, and network management constraints. These criteria are then used to route or switch the packets. Once a path is established based on a given set of criteria, the path is maintained for the duration of the session. Paths may be set up manually or automatically by flow.

Unlike MPLS, no label distribution takes place in the present method. This helps save enormous amount of node processing. This also helps avoid network traffic clogging because the transmission of labels from the egress to the ingress routers and through all routers in between does not take place at all. Allocation of VC labels is done through algorithmic processes running in a node. The allocations are updated in an as-required manner.

Further, the replacement of IP addresses with VC addresses of local links in any session makes the security of the transmission process similar or even better than that available in a Virtual Private Network (VPN) since the IP headers now have local significance only. Still other aspects and advantages of the present invention will become readily apparent from the following detailed description, simply by way of illustration of the best mode contemplated of carrying out the invention. As will be realized, the invention is capable of other and different embodiments, and its several details are capable of modifications in various obvious respects, all without departing from the invention. Accordingly, the drawing and description are to be regarded as illustrative in nature, and not as restrictive.

DETAILED DESCRIPTION OF THE INVENTION

An example of VIPS approach for the Internet Protocol Version 4 (IPv4) follows. In the conventional IP packet, the two IP-header address fields are each 32 bit long. These fields constitute IP source and destination addresses. If the first eight bits are all zeroes in the destination address field, or if the first five bits are all ones in the destination or source address field, then the packet is not a conventional IPv4 packet. By assigning one or more unique bit arrangements in the address field, an IP packet is marked for VIPS method described here. Alternatively, one or more bits, before or after the IP header, can be used as a marker to distinguish an IP packet as a VIPS packet—a packet that is different from a conventional IP packet. For example, one of the reserve bits in the TCP header can be used to identify the VIPS packet. Such one or more bits constitute what is called the Packet Marker in this method.

Once a packet arrives at or is internally created in a node, the unique Packet Marker bits in the IP header described above are checked to determine if the packet is a VIPS packet. If there is no match, this is a conventional IP packet for a session from or through this node. Then the destination address is checked to determine the IP path.

Figure 1:
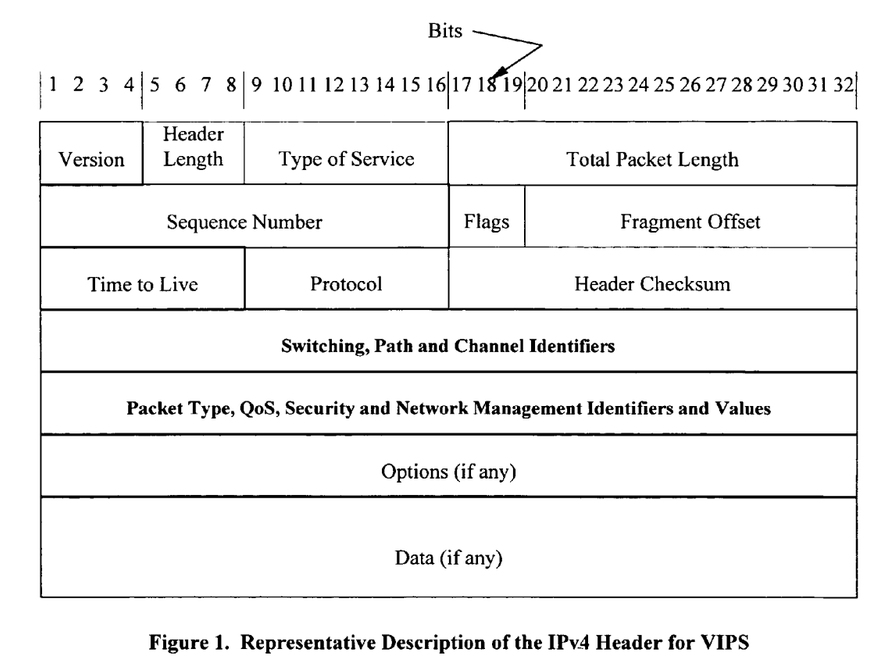
FIG. 1 represents the Internet Protocol Version 4 (IPv4) header for VIPS.

If the packet is an IP packet and is destined for a VIPS node going forward, both the source and destination IP addresses in this packet are removed. They are then added as separate labels to the packet in, before or after the IP header. The addresses can be between the IP header and IP Option fields, or in one or more IP Options fields themselves. In the place of the original IP addresses, the VIPS VC and other bits are inserted as described here below. In the packet, version number, QoS, security, and network management bits are added. FIG. 1 shows a representation of such a packet. Additionally, bits for virtual path and channel identifiers, from a pool of available VC identifiers, are placed. The VC identifiers may relate to the type of application that the protocol number along with the TCP or UDP port numbers and any other related parameters. The VC assignment therefore may define, in addition to the path and channel from this node to the next, the available bandwidth for this flow, the available buffer at this node, and other similar information for this flow, and whether the transmission is a constant bit rate or variable bit rate type.

The packet is transmitted to the node that is identified as the best-path adjacent node. This determination of the best path is performed with the help of conventional routing protocols running in the node and/or VIPS associated signaling mechanisms.

The VC identifiers along with the IP addresses, the outgoing and incoming port addresses, QoS identifiers, such as the TCP or UDP port number and/or the IP TOS parameters, security, and network management features are then saved in a switching table. The switching table is installed in the node interface port, or such other firmware or hardware part of the node.

Thus, as the first or lead packet travels from node to node in the VIPS network, the switching table at each node is updated with the VC and other applicable identifiers against the IP addresses. Upon arrival at a node that knows that the next node cannot handle the VIPS packet going forward, the packet's VC and other VIPS identifiers are removed and the IP addresses are reinstated in the IP header and the packet is routed as a typical IP packet.

VIPS network is a network that has two or more nodes that use VIPS method described here. VIPS converts connectionless, routed IP packets into connection-oriented, switched packets. VIPS uses the IP addresses carried in IP headers to initially establish a connection. Once the connection is established, the IP source and destination address fields are used to hold VIPS information.

VIPS packets are either first or generic packets. First packets, also called lead packets in this patent, consist of VIPS packet header plus IP source and destination addresses which may be in the IP Option fields for instance, and may be encrypted or in clear text. These packets are used for VC set-ups. Generic packets are identical to first packets, except for the fact that they do not carry the IP addresses in the Option fields or anywhere else.

When a first or lead packet arrives at a node, a connection acknowledgement (CACK) message is sent to the upstream node. The upstream node then starts sending the generic packets.

A representative packet handling process comprising representative packet format is now described here. The first packet in this packet processing methodology uses IP Option fields.

When an IP packet from a new flow arrives at a VIP network entry-point node, the packet is converted to a first or lead packet by assigning a Virtual Connection Identifier (VCID) to the connection, placing VIPS information in source and destination address fields in the IP header, and adding the source and destination IP addresses in the Packet Option fields. The node then establishes a connection for this flow with the adjacent, next hop, downstream node. Packets for this new flow are sent in a first or lead packet format until a connection acknowledgement (CACK) message is received from the downstream node. The assigned VCID is stored in a switching table along with other connection information such as corresponding IP addresses, TCP port numbers, QoS, network management and security parameters.

When a VIPS first or lead packet arrives at an intermediate node within a VIPS network, the intermediate node processes the lead Packet Option to obtain IP source and destination addresses. The destination address is used to look up the outgoing interface for the packet. A CACK message is sent to the upstream node. As in the network entry-point node, an intermediate node also establishes a connection for this flow with the adjacent, next hop, downstream node, and begins sending packets for this flow in the lead packet format. A new VCID is assigned for this connection, the old and new VCID pair is stored the switching table along with other connection information, and the VCID in the VIPS header is replaced with a new VCID. The packet is placed for outgoing transmission on the required interface.

When a VIPS first or lead packet from a new flow arrives at a VIPS network exit-point node, the VIPS packet is converted to an IP packet by restoring its source and destination IP addresses available from the switching table. In this node, as before, a switching table is created that comprises VCIDs, IP addresses and other relevant parameters similar to an intermediate node. The only difference here is that the table contains no outgoing VCIDs.

Once a connection is established from the network entry-point node to the exit-point node, using the first or lead packet, subsequent packets, the generic packets, are transmitted in the same path or VC.

The VCID found in the lead packet VIPS header is used to retrieve switching information for the switching of the generic packets. As a packet comes into a node, its VCID is swapped with the (outgoing) VCID from the switching table and the packet is transmitted.

No specific connection tear down processing is necessary as inactive connections are removed automatically after a predetermined duration of time for each node and flow.

Figure 2:
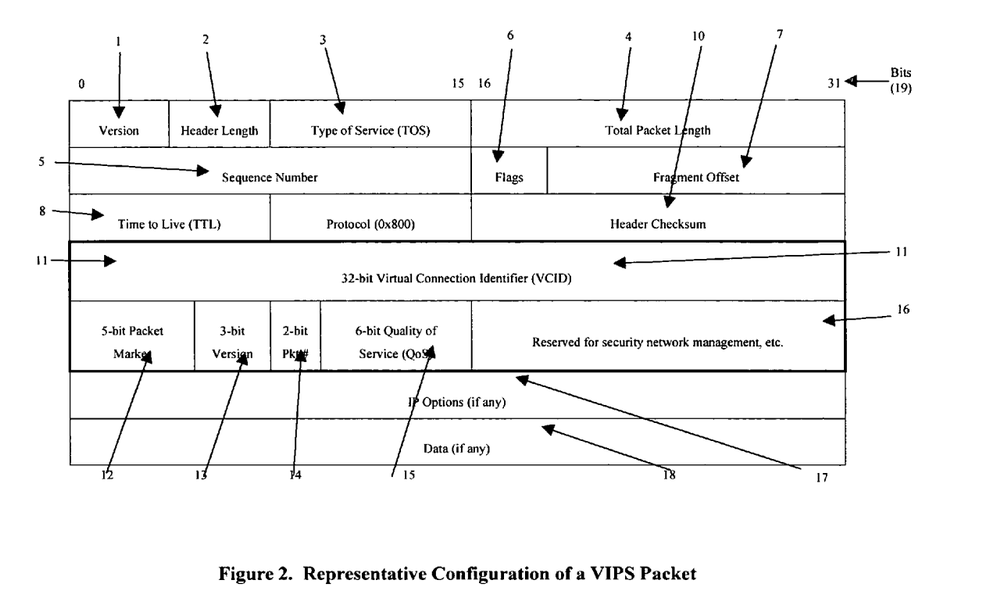
FIG. 2 represents configuration of a VIPS packet.

A summary of representative contents of the IP header converted to a VIPS header is shown in FIG. 2. The contents [1] through [10] represent the standard IP packet header contents. No changes are made to these contents for VIPS. The VIPS-specific contents start with content identified as VCID [11]. The VCID [11] comprises 32 bits. The VCID contains the virtual connection identifier for a given flow. The VCID is made of two parts: Path Identifier (PID) and Channel Identifier (CID). A CID can be a subset of PID, however, each identifier comprises a set of bits. In a 32-bit VCID, typically, a 16-bit PID coexists with a 16-bit CID. This could also be configured as 12-bit PID with a 20-bit CID, for instance.

The Packet Marker [12] comprises 5 bits. The Packet Marker field consists of a bit pattern of all ones to distinguish a VIPS packet from an IP packet. When VIPS packets are read as IP packets, the destination address is invalid as the first octet is above 247 (indicating an address above Class E).

The Version [13] consists of 3 bits. The Version field indicates the version number of the VIPS header. The version number can go only up to 6 to prevent the possibility of generating a broadcast packet.

The Packet Number [14] comprises 2 bits. This field identifies the packet as either a first or lead packet, for example binary 01 for a first packet, for example binary 00 for a generic packet.

Quality of Service [15] comprises 6 bits. In this representative example, the QoS field provides up to 64 unique levels of service. This field is provided for external QoS services.

The Reserved [16] has 16 bits. This field may be used to carry security information, network management messages, or extend the levels of QoS for example. Parts of this space may contain, for example, keys, or marker for keys, for encryption of IP addresses in the first packet.

Lead packets provide the information required to construct switching entries for a switching table at each hop along a connection's path. The lead packets are different from generic packets in that they carry the original source and destination IP addresses for the connection.

Figure 3:
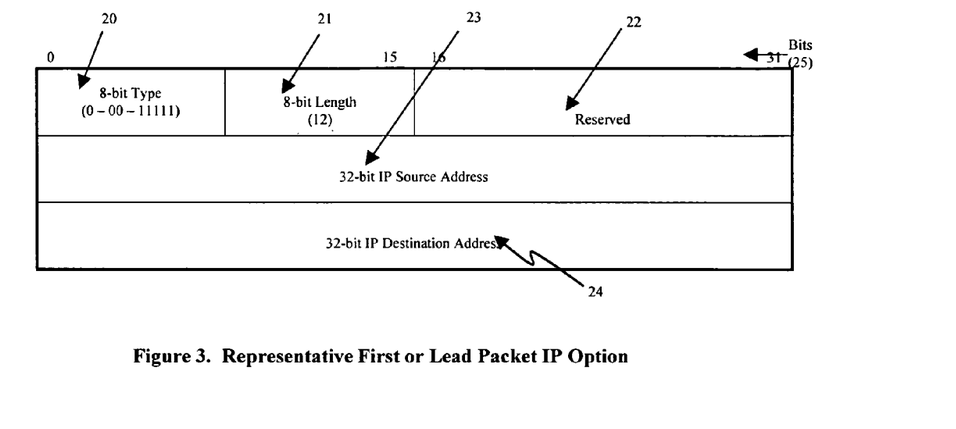
FIG. 3 represents First or Lead Packet IP Option.

A representative first or lead packet IP Option is shown below in FIG. 3. The IP Option Type [20] is an 8-bit field that identifies Copied 0, Class 0, Number 31. These are non-standard and may change from network to network. The field—[21] denotes the length while [22] is left as reserved. The field [23] contains the IP Source Address, while the field [24], IP Destination Address. These are the addresses removed from the incoming packet's IP header. The addresses may or may not be encrypted. The sequence of bits is shown as Bits [25].

The details of node-to-node packet switching process is described here.

Switching packets may require that groups of packets, following the same network path, be aggregated under a single identifier. Grouping packets by their source address, destination address, and Layer 4 port numbers is one aggregation example.

Switching is facilitated by the use of one or more of the two flow identifiers: the PID and CID.

When a new flow arrives at an edge node, a switching entry is created in a switching table and a new PID and CID are assigned. One or more subsequent packets are then converted into the lead packet format. The node's routing table is queried for the next hop and the transmitting interface is added to the switching entry for that flow.

Packets are then transmitted to the next hop. At each hop, lead packets are used to create new switching entries. The Packet Number field in the VIPS header is set to binary 1. An upstream interface continues to send lead packets, for a given flow, until it has received a CACK from the downstream node. At this point, the upstream node sends generic packets with a Packet Number equal to 0.

If the arriving packet's marker bits indicate that it is a VIPS packet at the first node, then its Packet Number bits are checked to determine if it is a first VIPS packet. Two cases exist.

First, yes, this is a first VIPS packet. In this case, the packet's VCID is checked in the switching table to see if a match exits. If there is a match between the VCID in the packet with those in the switching table, then the incoming VCID is replaced with the outgoing VCID from the switching table and the packet is forwarded out of the node through the outgoing port as indicated in the switching table. In such a packet, there are no extraneous IP address labels to examine or replace. The switching is thus fast, content-based, and secure since the IP addresses have been replaced. This process is continued from node to node all across the VIPS network.

Second, no, this is not a VIPS packet. In this case, the packet is converted to a lead VIPS packet. It then travels as far as it can as a VIPS packet and thereafter it is converted into the classical IP packet at the last VIPS network node. At the last hop, packets are converted back into normal IP packets and sent to the IP layer for processing.

In the VCID switching process, VCID may be assigned by VIPS-enabled output interface and has local significance only.

If, when a VIPS packet arrives, the VIPS network requires that the existing path be changed, then this packet is converted into a new, lead VIPS packet and sent over an alternate, best available path. In this VIPS packet, the IP addresses taken from the switching table are provided in the Option field or other fields and the Packet Number bits changed to indicate that this is the lead packet. The configuration of this packet then becomes similar to that of any other first VIPS packet. This lead packet thus establishes the new alternative connection node to node. The remaining packets in this stream of packets will then follow the new path and the process will be same as described here above. If the original VC is restored at a later time, the node can easily change the VC identifiers to indicate the alternate VCs if necessary.

This ensures that at any time, a node can redirect the flow of packets from a predetermined path to a new path when needed. Redundant paths can therefore be established by sending a lead VIPS packet with the IP addresses and with alternate VC identifiers over an alternate set of nodes. When this is done, the alternate VCID information is entered into the switching table at this node.

If no VCs or IP addresses exist for the received VIPS packet in the switching table, and it is not a first packet, the packet is considered an erroneously received packet, and is discarded. A network management message is generated at this time and sent to the sending node for that packet if possible.

VIPS requires a small number of control messages to facilitate the discovery and maintenance of neighbor relationships and to reliably instantiate virtual connections.

Upon boot up, each node sends out a broadcast or multicast Hello message to all its neighbors through all its active ports and starts a timer for each port. This packet has the VIPS Packet Marker along with it the designated VCID for Hello packets. The purpose of Hello message is twofold: to ensure that an adjacent node is VIPS aware before sending VIPS packets and, to identify when an adjacent interface is down or the VIPS capability has been discontinued if possible.

A representative packet format of such Virtual Connection Identifier (VCID) is where the 16 high order bits, for instance, are all zeroes (0s). Such a format therefore would indicate a control message. The type of control message is identified in the low 16-bit portion of the VCID.

Other identifiers may be sent that indicate sending node's IP address, its available node resources, physical ports available along with available bandwidth, and available pools of VC identifiers by type and size.

This Hello packet is then ready for VC set up.

The receiving node after receiving the packet, checks the Packet Marker and determines that the packet is a VIPS packet and carries a message announcing a neighboring node's existence and its available resources. The receiving node notes the physical port that this first VIPS packet arrived on, the IP address of the new neighbor's connected port, and the neighbor's available link and node resources.

Figure 4:
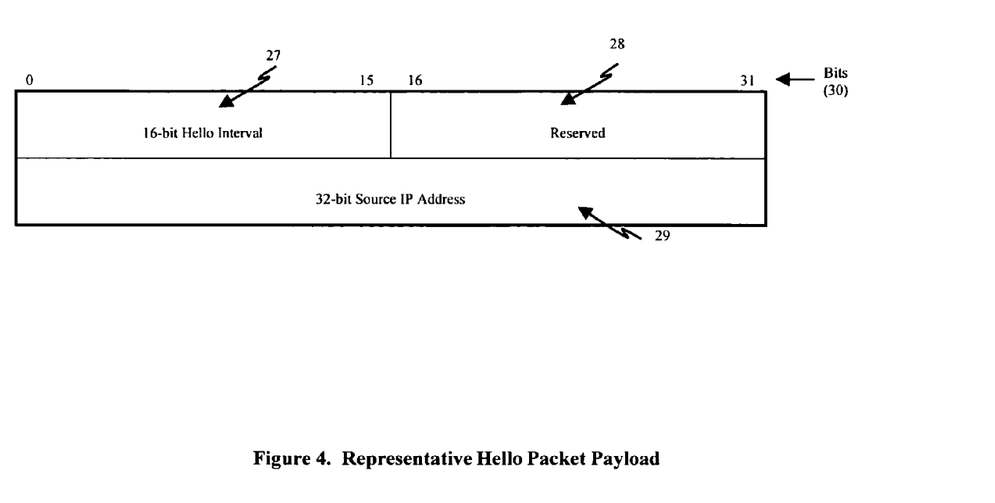
FIG. 4 represents Hello Packet Payload.

A representative payload of a Hello packet is shown below in FIG. 4 with a description of each packet component. The representative fields of Hello Interval [1] and the Reserved field [2] each consists of 16 bits. The Hello Interval indicates, for example, the number of seconds between the sending of consecutive hello packets. An adjacent VIPS node (receiving node) multiplies this value by a given multiplier to derive the threshold at which it will consider the transmitting node as inactive or down. The third part of the Hello Packet [3] comprises the Source IP Address of 32 bits.

The first or lead packet of a new virtual connection carries the source and destination IP addresses of the original IP packet as well as the VCID assigned by an upstream VIPS-enabled node. Switching entries for new VCs are constructed at arrival nodes using this information. The first or lead packets are sent until a connection is established.

A downstream VIPS-enabled node sends CACK packets in response to each first or lead packet it receives. A CACK packet is a VIPS control message packet with special PID, CID bit assignment. By sending a CACK packet, the downstream node notifies the upstream node that it has constructed a switching entry and is therefore able to handle generic packets for a given connection. When an upstream node receives a CACK packet for a given virtual connection, it sends future packets in generic format.

Figure 5:
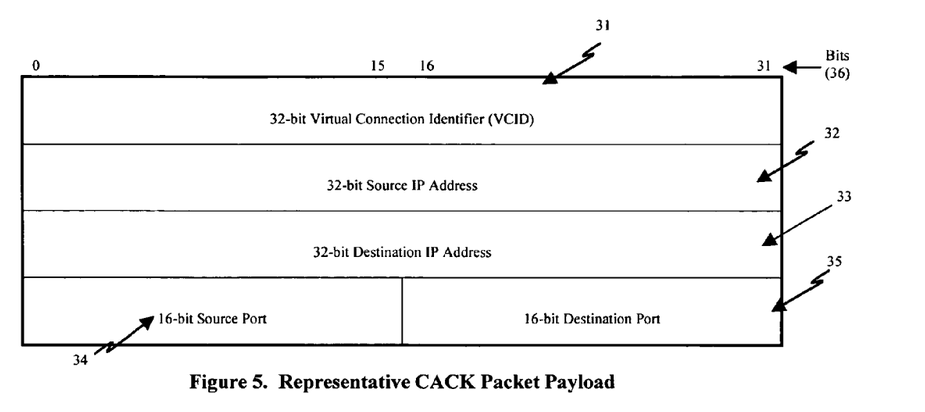
FIG. 5 represents connection acknowledgement (CACK) packet payload.

A representative payload of a CACK packet is shown below in FIG. 5.

The VCID [31] shown here represents the VCID of the flow being acknowledged. This also represents the identifier for which a switching entry has been constructed. The Source IP Address [32] and Destination IP Address [33] each consists of 32 bits. The Source Port [34] and Destination Port [35] each comprises 16 bits.

If the receiving node is not a VIPS node but a classical IP router or switch, it may not accept the packet since the VIPS Packet Marker in the destination IP address space is not allowed in the conventional IP routing. The packet is discarded by such a node.

In addition to the above control message described, a node performs several other activities. Each node periodically sends out a set of information exchange packets to its neighborhood nodes. These packets carry information regarding one or more of: available resources, status of pools of VC identifiers for the best paths available for a set of values such as QoS, security, network management, and any other pertinent information that is unique to the network.

These packets are formatted similar to the generic packets except that the VCID and the information in each such packet identify the nature of information.

Figure 6:
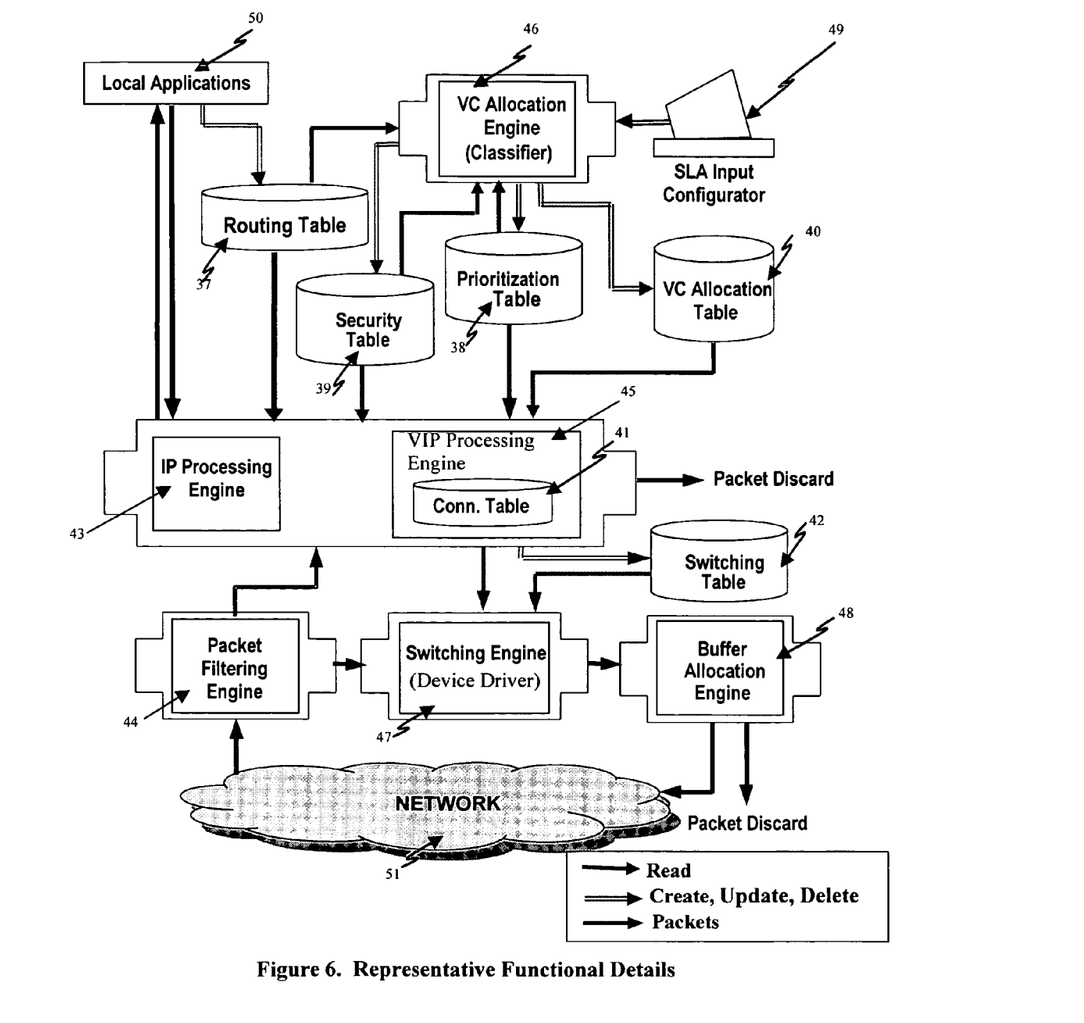
FIG. 6 represents functional layout of various engines and tables for a VIPS machine.

A representative functional layout of the various engines and tables necessary to build a VIPS machine is given in FIG. 6. The layout represents each table that is used to store and retrieve routing or switching information. The engines represent the process engines that must exist to adequately create, process, store or delete the various tables and their entries.

Routing Table (37): This is built from one or more legacy routing protocols such as OSPF, RIP, RIPII, BGP and others. There may be additional inputs to this table derived from S3 extensions to the common routing protocols.

Prioritization Table (38): This table comprises QoS parameters and related network management parameters.

Security Table (39): This contains security parameters if such parameters are considered affecting the flow characteristics of the network.

VC Allocation Table (40): This table contains available outgoing PID, CID allocations for different levels of QoS, and if necessary for other parameters. This table is a standard, pre-configured feature of the system, however, it can be modified with manual inputs.

Connection Table (41): This table contains all incoming and outgoing PID, CID values, QoS values, as well as source and destination addresses, and source and destination port numbers. Additionally, the table contains an Outgoing Interface Pointer that points to the outgoing interface.

Switching Table (42): This table is similar to the Connection Table and is used to switch packets.

IP Processing Engine (43): It processes conventional IP packets. Additionally, it does the typical IP processing.

Packet Filtering Engine (44): It filters received packets by Packet Marker and other identifiers to determine if the packets are meant for IP or VIP processing engines.

VIP Processing Engine (45): It processes packets using inputs from the Prioritization Table, Routing Table, Security Table, and VC Allocation Table, and sends the packets to the Switching Engine or the IP Processing Engine as needed.

VC Allocation Engine (46): It builds and maintains the VC Allocation Table with input from the Routing Table, Security Table and Prioritization Table. It also takes instructions from the manual Configurator to override automated Prioritization Table values.

Switching Engine (47): It is the final step before the packet is put into the buffers for sending them out. This engine replaces the incoming CID, PID with the outgoing CID, PID received from, the Switching Table.

Buffer Allocation Engine (48): There may be more than one of these engines, for example, one on the input side and the other on the output side. This engine allocates buffer by QoS requirements toward prioritization of traffic.

SLA Input Configurator (49): This allows manual configuration for various SLA requirement or QoS requirements.

Local Applications (50): These are applications running in the node.

Network (51): This is a network that a VIPS node interfaces.

VIPS forms the basis for providing advanced network services including QoS support. A representative use of VIPS header along with a use of queuing discipline to provide QoS support is given in this patent. VIPS technology may be used with any queuing discipline. This patent addresses the use of link-sharing mechanism in VIPS to provide QoS support. When used in packet networks, prioritization of packet flows through proper queuing provides control over bandwidth allocation in times of congestion.

Before transmission, flows are aggregated into a number of traffic classes based upon user-defined policies. Traffic classes may be hierarchical in nature with interior and leaf classes. The hierarchical link-sharing structure specifies the desired division of bandwidth for a particular link among leaf classes. Interior classes guide the use of excess bandwidth among leaf classes.

The VIPS node at a network entry-point node classifies flows based on a set of user-defined policies. It examines enough leading packets of a flow to determine the classification level. This information is then carried within the QoS field of the VIPS header. This classification process is performed at the entry-point node. Subsequent packets from the same flow then use and carry this predetermined classification level.

Each classification level represents desired bandwidth support. For instance, higher classification level may represent higher priority in transmission.

Each outgoing link is associated with one or more queues. These queues along with a queuing discipline determine the order in which packets are transmitted. All VIPS nodes in the path, including entry-point node, of this flow uses the classification information to place packets into appropriate queue. Queuing is performed on the outbound interface of VIPS nodes. The process places packets into a number of classes which may have different priorities. In order to place packets into appropriate classes, they are first identified based upon a set of policies. These policies are either manually entered through SLA configurator [49] or automatically propagated through the first or lead packets.

Figure 7:
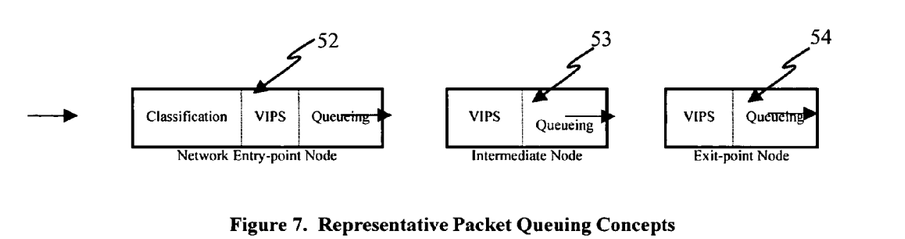
FIG. 7 represents a queuing mechanism.

FIG. 7 represents a representative queuing mechanism. In this representative queuing, VIPS networks classify flows as opposed to packets. Classification is performed on one or more packets from the start of a flow at the network entry-point VIPS node [52]. For each packet of a flow, the classification information is carried in the QoS field of the VIPS header until the network exit-point node [54] is reached via an intermediate node [53]. VIPS networks use such queuing on outbound interfaces to give certain flows priority over others. Classes are defined in terms of bandwidth constraints, priorities, and weights. For example, priority values may range between 1 and 8 where priority 1 is the highest priority. Once bandwidth requirements have been met for all classes at a certain priority level, classes of the next lower priority level are serviced. Within a priority level, classes are serviced in a weighted round-robin fashion. Class priority and weight ultimately determines bandwidth allocation among contending classes. Classes within a given priority level are assigned appropriate weights to reflect classes dependent upon the applications being serviced.

VIPS classifies flows based upon policies. For example, one policy may send all HTTP traffic to a low priority class while another may send all traffic destined for a particular IP address to an isolated, high priority class. Additionally, VIPS may be used to support 64 levels of classification as reflected by the representative 6-bit QoS field in the VIPS header. One high priority, isolated, low bandwidth class may typically be reserved for VIPS control traffic. A VIPS network entry-point node examines one or more packets from the start of a flow to find the best policy match. Once a match is found, the associated QoS value is placed in the flow's switching entry. Handling of packets from established flows is based upon previously determined QoS values; no further examination is required.

The sum of bandwidth allocated for each class can be up to the total bandwidth of an outgoing link. VIPS nodes may purposely leave some bandwidth unallocated. Any class that is configured to borrow bandwidth in times of congestion can share this unallocated bandwidth. This approach can allow flexible bandwidth allocation boundaries among classes. The priority level and weight of borrowing class determines the allocation of this bandwidth. For example, a class of priority 1 receives bandwidth from this allotment before any lower priority classes.

Figure 8:
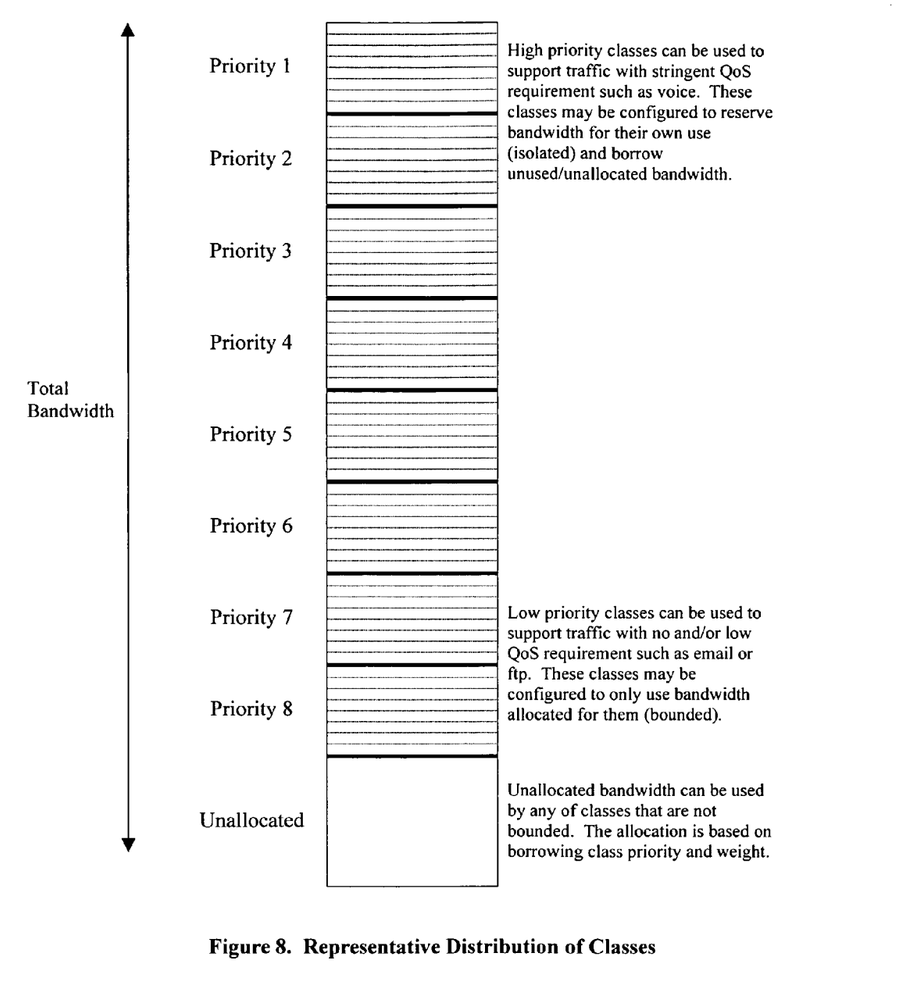
FIG. 8 represents distribution of classes.

For example, this queuing algorithm can be set up in the following manner on a 100 Mbps link. As shown in FIG. 8, sixty-four (64) classes are set up. Each class is configured to receive 1 Mbps. The highest priority level classes are isolated; that is 8 Mbps are reserved to service only traffic belonging to classes with priority 1. Further, classes within a priority are assigned to different weights. For instance, VIPS networks may reserve one class to support control messages, usually of the highest priority. Thus, these control messages can be mapped to priority 1 class with the highest weight. All voice traffic may be mapped to priority 1 class. Voice encoding may be used to further map voices to classes with different weights.

One example of traffic to class mapping is based on applications; voice to priority 1, video to priority 2, http to priority 3, interactive application such as telnet to priority 4, file transfer to priority 5, email to priority 6, and others to priority 7 and 8. Another example of traffic to class mapping may be based on host addresses. A service provider may give certain customer sites higher priority to fulfill its service level agreement.

The priority 5 class may be bound, that is, this link allows only up to 8 Mbps of file transfer traffic at any given time in the first example mapping. Notice that there is 36 Mbps bandwidth that is not allocated to any of classes. This bandwidth can be used by any class that is not bound. The allocation of this bandwidth is based on priority and weight of borrowing classes.

For transmission of the priority and classes across a VIPS network, the VCID bits may be used. The size of a pool of VCs meant for voice transmission for instance is decided by the total number of bits allocated. For example, as shown in FIG. 2 above, if it is decided that 12 bits are allocated for Virtual Paths (VPs) and 20 more for Virtual Channels, wherein a virtual channel is a subset of a VP, then a total of over a million Virtual Channels are available for each of the 4,096 Virtual Paths in each physical link between any two nodes. This provides for a pool of more than four billion virtual connections between any pair of physical ports.

This also can facilitate mapping of a virtual link to a wavelength in an optical medium, a frequency or a code in a wireless channel, or a time slot in a time-division multiplexing switching and transmission medium. A subset of VCIDs may be used for transiting from one autonomous network to another from hierarchical arrangement of nodes.

The algorithm of VC allocations is set at the beginning and may be updated on a periodic basis depending on the type of network and applications running on it. The algorithmic approach reduces the number of packet exchange and thereby makes additional bandwidth available for payload traffic.

Any VIPS VC distribution is easily modifiable because the information exchange messages help the nodes update these pools as traffic flows dictate. Allocation of processing resources such as CPU processing, buffers, input/output resources, and other related resources is done based on the size and type of pools. Such allocation is maintained in the background and is related to the parameters in the switching table.

For instance, the music streams gets a guaranteed allocation of buffer space ahead of other packets toward minimizing inter-packet jitter which will affect the fidelity of music more than the intelligence of speech. However, such allocation may be maintained, removed or altered once a voice session ends. Each type of allocation may be further broken into sub-allocations depending on a combination of factors. Such factors comprise the types of application, volume of traffic for a given type of application, available physical resources, and policies associated with the network. It is therefore quite possible that in a given network music and speech are allocated two different prioritizations: music more than speech though both fall in the voice allocation category. It is also possible that music get a higher prioritization than video games. Similarly, though both file and e-mail are in the data VC category, file transfer will get a higher prioritization than e-mail.

The network administrators are also be able to update the VC pools as necessary either based on policy decisions or on operational constraints. Once VC pools are updated, all neighboring nodes are notified using the information exchange packets and their switching tables are adjusted accordingly.

Hence, in the method described heretofore, the first packet allows for establishing node-to-node path that the later packets follow during a session. A timer is used at each node to start the needed life span of a session during which the tables of values are maintained in a node. After a certain period of inactivity in a path, the values for a path are removed from the switching table. Applicable identifiers for the virtual connections are then made available to the needed pools.

A packet's virtual connection is ascertained and maintained for all other packets that are in the same category of QoS and other defined parameter categories. In the method described here, one does not need to take help of ATM or any other lower layer protocol to implement bit rates such as Constant Bit Rate (CBR) or variable bit rate (VBR) for a given set of QoS or traffic characteristics.

Another unique characteristic of this method is its robust security feature. This method provides a total privacy for the source and destination information. Since the address bits are replaced with the VC bits which only have local significance from node to node, the source and destination addresses of the message are never revealed at any intermediate point of transmission between any two nodes. As for the IP address carried in the first packet, they are protected through encryption. The key for such encryption is transmitted in the security bits. Thus the IP addresses remain hidden throughout a session. Anyone trying to snoop on a message will never find out the total significance of the message. The method also allows for encryption of the message node to node using another encryption key in the security part of the VIPS fields, or through using a special VC that carries the encryption key in it. Thus if the security fields carry adequate number of bits, the first half of the bits, if not all zeroes, would indicate the encryption key for the IP address while the second half, if not all zeroes, would indicate the encryption key for the message itself. While the former is updated from node to node through the information exchange messages, the latter is updated from the entry-point node to the exit-point node in the VIPS network by network administrator or the nodes themselves.

The process described here comprises modifying the packet handling functions after the packets are received in the network interface. When the packets are received, their Layer 2 headers are removed, and the packet fields are checked for the type of packet. The processing hereafter depends on the type of packet. For example, if the packet is verified as an IP packet meant for classical IP processing from the bits in the Packet Marker space, it is put into the IP input queue which generates a software IP interrupt for the kernel. Otherwise, the packet is put into the VIPS process queue. Here the IP header is checked for the values in the IP address fields. The header length is determined to ascertain the size of the packet. Type of Service (TOS) value may be used when necessary.

The values from the IP address fields in this VIPS packet determine what needs to be done with the packet as described above that is by comparing with the values in the switching table. Depending on the prioritization requirements, the packet is assigned to the out going port buffers. If the packet is meant for this node, it is passed on to the TCP, UDP or any other higher layer function as needed. The parameters from the address fields are entered in the switching table in the appropriate locations as updates.

The process described here above is coded as software in the central processing unit of the device as well as in the port firmware. The former is for Layer 3 processing and for any higher layer interfacing. The latter will typically comprise the switching tables and associated processing. This method described is independent of the hardware platform used or the software operating system.

While the foregoing has described what are considered to be preferred embodiments of the invention it is understood that various modifications may be made therein and that the invention may be implemented in various forms and embodiments, and that it may be applied in numerous applications, only some of which have been described herein. It is intended by the following claims to claim all such modifications and variations which fall within the true scope of the invention.

What is claimed is:

1. A method of switching digital information packets between network nodes, including the steps of:
    forming a digital Internet Protocol (IP) information packet having an IP header including a first portion allocated for service-related fields and a second portion allocated for IP address fields; the second portion comprising at least one of the following fields:
        a Packet Number field for indicating whether the packet is the first packet in a chain of packets, or a generic packet for a specific purpose;
        at least one virtual connection identifier;
        a Quality of Service (QoS) field for identifying parameters of Quality of Service;
        a management field containing a management message; and
        a security field for indicating security parameters for providing security of packet transmission; and
    processing information contained in the IP header to provide switching of the IP information packet.

2. The method of claim 1, wherein the virtual connection identifier is provided for identifying at least one virtual channel and at least one virtual path, and the virtual channel is a subset of the virtual path.

3. The method of claim 1, wherein the portion allocated for IP address fields further comprising a packet type field for identifying the method of switching.

4. The method of claim 1, wherein the QoS field includes a Class of Service (COS) field for identifying parameters of Class of Service.

5. The method of claim 1, wherein at least one table is provided for storing packet switching information.

6. The method of claim 5, wherein the table is configured for storing the virtual connection identifier.

7. The method of claim 5, wherein the table is configured for storing the security parameters.

8. The method of claim 5, wherein the table is configured for storing the management message.

9. A packet switching system for switching digital information packets, comprising:
- a packet identifying unit for identifying an incoming IP packet to determine a virtual connection identifier and a type of digital information carried by the incoming IP packet having an IP header including a first portion allocated for service-related fields and a second portion allocated for IP address fields, the virtual connection identifier being arranged in the second portion of the incoming packet; and
- a path selection unit responsive to the virtual connection identifier for selecting a path suitable for the determined type of the digital information.

10. The system of claim 9, wherein the virtual connection identifier is provided for identifying at least one virtual channel and at least one virtual path, and the virtual channel is a subset of the virtual path.

11. The system of claim 9, further comprising a control unit responsive to incoming packets for assigning priorities for transmission of the incoming packets.

12. The system of claim 11, wherein the control unit is configured to allocate transmission bandwidths based on the assigned priorities.

13. The system of claim 12, further comprising an input configuration unit responsive to a user input for changing the assigned priorities.

14. The system of claim 13, further comprising a security unit for setting security parameters.

15. The system of claim 14, further comprising a switching table for storing virtual connection identifiers of the incoming packets.

16. The system of claim 15, wherein the switching table further comprises the security parameters set by the security unit.

17. The system of claim 16, wherein the switching table further comprises management parameters for determining packet processing parameters.

18. A communications system comprising
- a packet identification mechanism for identifying a digital IP information packet having an IP header including a first portion allocated for service-related fields and a second portion allocated for IP address fields, the second portion having a virtual connection identifier, and
- a path selecting mechanism for by selecting paths suitable for digital information carried by the packet, based on the virtual connection identifier.

19. The system of claim 18, wherein the virtual connection identifier is provided for identifying at least one virtual channel and at least one virtual path, and the virtual channel is a subset of the virtual path.

* * * * *